United States Patent [19]

Leclercq

[11] Patent Number: 4,968,895
[45] Date of Patent: Nov. 6, 1990

[54] LAMINATED GLASS WITH PHOTOSENSITIVE ELEMENT AND AUTOMATIC DEVICE FOR TURNING ON AND OFF LIGHTS OF A MOTOR VEHICLE

[75] Inventor: Jacques Leclercq, Roisel, France

[73] Assignee: Saint-Gobain Vitrage, Courbevoie, France

[21] Appl. No.: 779,406

[22] Filed: Sep. 24, 1985

[30] Foreign Application Priority Data

Oct. 4, 1984 [FR] France ................ 84 15248

[51] Int. Cl.⁵ ............................ B60L 1/14; B60Q 1/02
[52] U.S. Cl. .................................. 307/010.8; 315/82; 315/149
[58] Field of Search ................. 307/10 LS, 10 R, 117, 307/010.8; 357/72; 250/211, 239; 315/82, 83, 149, 150, 158, 159

[56] References Cited

U.S. PATENT DOCUMENTS 3,789,191 1/1974 Spindler ..................... 219/203 X

FOREIGN PATENT DOCUMENTS 963562 2/1975 Canada ..................... 307/10 LS
2157901 10/1972 France .
2160389 10/1972 France .

*Primary Examiner*—William M. Shoop, Jr.
*Assistant Examiner*—Sharon D. Logan
*Attorney, Agent, or Firm*—Pennie & Edmonds

[57] ABSTRACT

A laminated glass of the present invention includes as a photosensitive element a photodiode of such thickness that it can be buried in the plastic interlayer of the laminated glass between two outside glass sheets of the glass. The photodiode is coated in a plastic compatible with that from which the interlayer is made and mounted along one of the side edges of the glass, so that conductors from the diode and their terminals project out from the glass and can be connected to any suitable electric circuit. The electric circuit for use with the diode can be a lighting circuit of a motor vehicle so that the photodiode automatically controls turning on of the lights of the vehicle when ambient light falls below a certain threshold and turning off the same lights when ambient light exceeds a second threshold.

8 Claims, 1 Drawing Sheet

U.S. Patent  Nov. 6, 1990  4,968,895
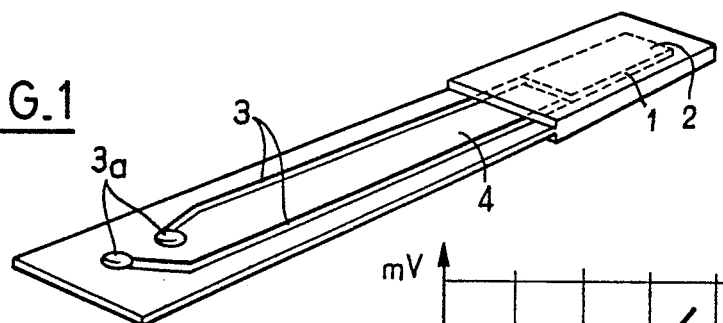
FIG. 1
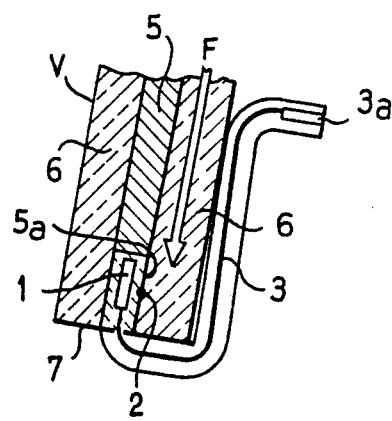
FIG. 3
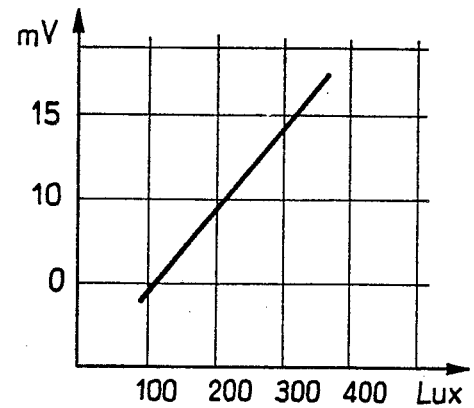
FIG. 2
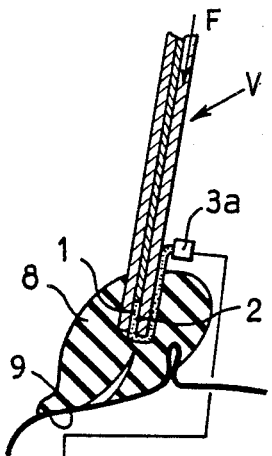
FIG. 5
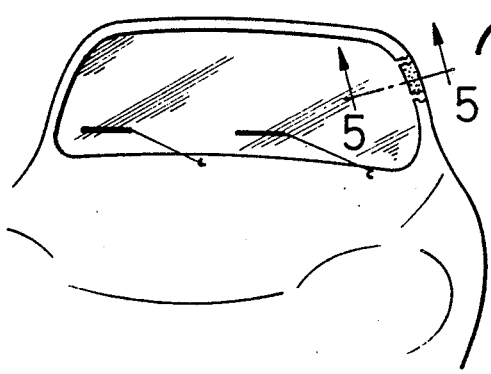
FIG. 4
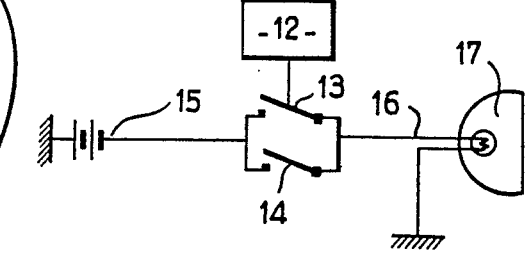

LAMINATED GLASS WITH PHOTOSENSITIVE ELEMENT AND AUTOMATIC DEVICE FOR TURNING ON AND OFF LIGHTS OF A MOTOR VEHICLE

TECHNICAL FIELD

This invention relates to laminated glass which consists of two glass sheets joined together by a plastic interlayer, generally consisting of polyvinyl butyral. Such glass is often used as a safety windshield for automobiles.

BACKGROUND INFORMATION

It is known, as shown in French patent No. 2,157,901, that photosensitive elements may be incorporated in windshields, whether the glass of such windshields are laminated or tempered. A photosensitive element in a windshield may then automatically control the turning on and off of the lights of a motor vehicle based on variations in ambient light.

In prior art devices, the photosensitive element was a relatively bulky photoconductive cell which required the glass to be pierced during installation.

The sensitivity of such photoconductive elements was inadequate.

The present invention, which remedies these drawbacks, is an improved laminated glass incorporating a improved photosensitive element. The glass lends itself to better mounting in a motor vehicle and improved control of an automatic device which turns on and off the lights of the vehicle.

SUMMARY OF THE INVENTION

The laminated glass of this invention incorporates, as its photosensitive element, a photodiode of such a thickness that it may be buried in the plastic interlayer of the laminated glass. The photodiodes used in this invention, preferably silicon cell diodes, have a thickness such that they may be placed in the plastic interlayer, generally polyvinyl butyral, of the laminated glass. The interlayer of the laminated glass generally has a thickness on the order of 0.7 mm.

In comparison to the prior art, this improved photosensitive element considerably simplifys the manufacture of the glass as no orifice is made in the glass. In the present invention, a slot is made in the polvinyl butyral layer during manufacture of the laminated glass and the photosensitive element is incorporated therein.

Prior to being placed in the plastic interlayer, the photodiode is coated with plastic compatible with the interlayer of the glass. This coating increases the strength of the photodiode and aids in the incorporation of the photodiode in the interlayer. The photodiode is preferably placed in the interlayer in the vicinity of one of the edges of the glass. The conductors of the diode extend beyond the edge of the glass and are connected to an outside electric circuit.

In addition to the ease with which it may be incorporated in laminated glass, the improved photodiode has the advantage of a near linear response to ambient light. Therefore, the photodiode provides improved control of the devices responsing to it, in particular, an automatic device for turning on and off the lights of a vehicle in which the glass is mounted.

The present invention may be better understood with the aid of the following description, given solely by way of example, and reference to the accompanying drawings.

BRIEF DESCRIPTION OF THE DRAWINGS

FIG. 1 is a perspective view of a photodiode which can be used in the present invention and can be provided with a plastic coating prior to placement in the interlayer of laminated glass.

FIG. 2 is a graph illustrating the voltage response of the photodiode. The ordinate of this graph is the voltage in millivolts across the terminals of the photodiode as a function of the ambient light plotted in lux on the abscissa.

FIG. 3 is a cross sectional view of laminated glass with a photodiode according to FIG. 1 incorporated in its interlayer.

FIG. 4 is a front perspective view of a motor vehicle with a windshield glass of FIG. 3.

FIG. 5 is a view, on a larger scale, in section along line 5—5 of FIG. 4 along with a diagram of the automatic control device by which the photodiode controls the vehicle lights.

DESCRIPTION OF THE PREFERRED EMBODIMENT

As stated above, the present invention relates to the incorporation of a photodiode in laminated glass for use in motor vehicles or the like. This photodiode acts as a photosensitive element which measures ambient light and, from this measurement, automatically controls a function of the vehicle on which the laminated glass is mounted, in particular, the turning on and off of the lights of the vehicle.

A photodiode of the present invention is shown in FIG. 1. The photodiode includes a strip of a photosensitive material, generally designated by 1, which preferably consists of silicon.

One of the faces 2 of this strip is the photosensitive element. The strip 1 is connected to conductors 3 which end at terminals 3a.

The silicon strip is the active element of the photodiode and has very small dimensions. Its length can be about 3.5 mm and its thickness 0.27 mm. The conductors 3 each have a diameter of 0.5 mm. Because of its small dimensions, the device is fragile. Therefore, the photodiode should be coated with a plastic such as an epoxy resin, compatible with the plastic of the interlayer of the laminated glass. The plastic coating should be sufficently transparent to permit the transmission of light energy and should preferably have an index of refraction approximately equal to that of the inner and outer glass sheets 6 of the laminated glass.

The fragile silicon strip is surrounded by a plastic layer sufficently thick to provide stiffness adequate to avoid any deformation when it is placed in the laminated glass.

After the plastic coating is applied, the resulting photosensitive element has a thickness of approximately 0.6 mm. The conductors 3 are coated with a layer of plastic on the order of 0.35 mm in thickness. This provides the conductors with the flexibility needed during installation of the devices.

The coated photodiode lends itself easily to incorporation in plastic interlayer 5, placed between two glass sheets 6, which generally consist of polyvinyl butyral. The two sheets and the plastic interlayer are the laminated glass used in such applications as a windshield.

The interlayer 5 generally has a thickness of 0.7 mm sufficient to accept the maximum thickness of 0.60 mm of the coated photodiode.

Mounting of the photodiode is shown diagrammatically in FIG. 3. The photodiode 1 is placed in interlayer 5 along one of the edges of the laminated glass V with its sensitive face placed parallel to the glass. The conductors 3 and their terminals 3a with their plastic coating can be folded around the edge 7 of glass V and then along one of glass sheets 6 so that the terminals 3a are accessible for connection to any suitable electric device.

The photodiode 1 is incorporated in the laminated glass, by first cutting in the interlayer sheet 5 before assembly of glass sheets 6, a notch 5a the approximate size of coated photodiode 1. Then, diode 1 is inserted in notch 5a. Interlayer sheet 5 is then framed by glass sheets 6 and the entire unit is subjected to heat and pressure in an oven and calender. The polyvinyl butyral plastic of the interlayer 5 is, thus, closed on the head of photodiode 1 fixing it solidly inside the laminated glass.

In comparison with the prior art glass incorporating a photosensitive element, the present invention can be manufactured quite simply. In the prior art devices, because of the dimensions of the photoconductive cells and their stiffness, it was necessary to notch the glass sheets after assembly, a complicated and costly operation.

Photodiodes of the present invention may be the commercial device, BPX40, presently marketed by the RTC Company. Such devices exhibit a voltage response to light more advantageous than prior art photoconductive cells.

This voltage response of such photodiodes is illustrated in FIG. 2. FIG. 2 plots the voltage across the terminals 3a in millivolts as a function of the light to which it is exposed in lux.

The value plotted on the ordinate of FIG. 2 is the voltages measured at the output of a current-voltage converter connected to terminals 3a which has a microampere input corresponding to an output of 25 millivolts.

FIG. 2 demonstrates that the response of photodiode 1 is practically linear between 100 and 400 lux, giving the device a very effective operating range between 100 to 300 lux.

The laminated glass V equipped with one or several photodiodes 1 can, for example, be marketed to automobile manufacturers to be incorporated in their vehicles as windshields for applications where a photosensitive element is needed to control automatic actions on the vehicle.

A particularly advantageous application for this glass is shown in FIGS. 4 and 5. In this application, the photodiode controls a device for turning the lights on and off of a motor vehicle automatically as a function of ambient light.

This device can be set to turn on the lights when the ambient light falls below a certain threshold, for example, 100 lux, as when night falls or when going through a tunnel. The device of this invention can automatically turn off the vehicle lights when the ambient light increases beyond a certain threshold, conveniently 300 lux, for example, at dawn or on coming out of a tunnel. To avoid untimely turning off of the lights, for example, when going through a series of tunnels, a delay is provided between the time when the ambient light exceeds 300 lux and the time when the lights are turned off by automatic action.

In this application, the photodiode should be placed in the glass so that the automatic function can not be disturbed by accidental light, such as that from the headlights of on-coming vehicles.

To achieve this, the glass V, as shown in FIGS. 4 and 5, in this case a windshield, is mounted on the vehicle so that photodiode 1 is placed in seal 8 of the windshield. In particular, the photodiode is inserted in that part of the seal 8 which is fastened in a side post 9 of the windshield support and in the upper half of this post. Experience showed that this was the most suitable location.

In this location, photodiode 1 is not exposed to any direct light and receives only the light transmitted through the laminated glass itself. To avoid any undesired exposure of the photodiode, its sensitive face 2 should be advantageously turned toward the inside of the vehicle, thus being exposed only to light arriving along arrow F.

The automatic device for turning on and off the lights of a standard type motor vehicle may be controlled by the voltage output of photodiode 1 at terminals 3a as shown diagrammatically in FIG. 5.

The control device includes an amplifier 10 and a control circuit 11 acting on a relay 12. The relay 12 actuates a switch 13 which is mounted in parallel with manual switch 14 on circuit 15, 16 of the lights 17 to be controlled.

Control circuit 11 includes a time-delay system operating only in the direction of turning off the lights 17. Thus, the lights are turned off only a certain time after the preset ambient light threshold, namely 300 lux, has been exceeded.

Experience has shown that a delay of 30 seconds is satisfactory in most cases.

Of course, the present invention is not limited to the embodiments described. These are given only by way of example.

Thus, although glass V has been shown as an automobile windshield, it can be any laminated glass.

Further, glass using to the present invention can include in its plastic interlayer more than one photodiode 1 if this proves desirable for the particular application contemplated.

I claim:

1. A laminated glass including an incorporated photosensitive element being a thin photodiode buried in the plastic interlayer of said laminated glass, the sensitive face of said photodiode being positioned in said plastic interlayer substantially parallel to at least one of the outerlayers of said laminated glass.

2. In a laminated glass as claimed in claim 1, a photodiode which is a silicon cell photodiode.

3. In a laminated glass as claimed in claim 1, a photodiode placed in vicinity of one of the edges of the glass, conductors connected to said photodiode going outside said glass for connection to an outside electric circuit.

4. In a laminated glass as claimed in claim 1, a photodiode and conductors attached thereto encased in a plastic coating compatible with the plastic of the interlayer of said glass to facilitate incorporation of said photodiode and said conductors in said interlayer.

5. In a laminated glass as claimed in claims 1, more than one photodiode buried in the interlayer of said glass.

6. An automatic device for turning on and off the lights of a motor vehicle comprising a laminated glass including a thin photodiode buried in the plastic interlayer of said laminated glass, the sensitive face of said photodiode being positioned in said plastic interlayer substantially parallel to at least one of the outerlayers of said laminated glass, conductors connected to said photodiode, said conductors mounted in parallel to a lighting circuit for a motor vehicle to control by an amplification circuit the lights of said vehicle, said lights being turned on when the ambient light decreases below a certain threshold and turning off when ambient light exceeds a second threshold.

7. An automatic device as claimed in claim 6, wherein the glass is the windshield of the vehicle, the photodiode is mounted on the inside of a mounting seal for said windshield along one of the side posts of said windshield, the sensitive face of said photodiode being turned toward the inside of the motor vehicle so that said photodiode is protected from any direct lighting and is affected primarily by the ambient light transmitted along the laminated glass through the inside glass sheet thereof.

8. An automatic device as claimed in claim 6, wherein the turn-on threshold for the lights is about 100 lux and the turn-off threshold for the lights is about 300 lux, a time delay being incorporated in the electric control circuit so that turning off is accomplished only a certain period after the threshold of 300 lux has been reached.

* * * * *